United States Patent
Nebolsine

[11] 3,954,620
[45] May 4, 1976

[54] FILTRATION AND BACKWASHING APPARATUS FOR USE WITH A WATER FILTRATION SYSTEM

[75] Inventor: Rostislav Nebolsine, New York, N.Y.

[73] Assignee: Hydrotechnic Corporation, New York, N.Y.

[22] Filed: Oct. 25, 1974

[21] Appl. No.: 517,862

[52] U.S. Cl. .............................. 210/275; 210/293
[51] Int. Cl.$^2$ ......................................... B01D 23/18
[58] Field of Search .......... 210/274, 275, 288, 291, 210/293

[56] References Cited
UNITED STATES PATENTS

| | | | |
|---|---|---|---|
| 1,572,398 | 2/1926 | Leopold | 210/293 |
| 1,871,122 | 8/1932 | Kretzschmar | 210/293 |
| 2,453,345 | 11/1948 | Row et al. | 210/274 |
| 3,493,116 | 2/1970 | Edmiston | 210/228 |

Primary Examiner—Charles N. Hart
Assistant Examiner—Ivars Cintins
Attorney, Agent, or Firm—Darby & Darby

[57] ABSTRACT

A filtration and backwashing apparatus, for use with a filtration system of the type having a filter bed, passes fluids through the entire cross-sectional area of a filter media bed at an even and uniform rate. The apparatus includes two plenum chambers, one being formed between a slotted plate supporting the filter media and the top of the structural deck, the second or lower chamber being formed below the structural fluid-tight deck; nozzles communicating between the two plenum chambers; and means to introduce and pass fluid, either air or water into either the upper or lower plenum chamber.

1 Claim, 3 Drawing Figures

FILTRATION AND BACKWASHING APPARATUS FOR USE WITH A WATER FILTRATION SYSTEM

BACKGROUND OF THE INVENTION

It is generally recognized that when a filtration process or apparatus is evaluated in terms of treatment performance, the filter bed assumes primary importance. This is especially true for filtration processes or units with deep beds composed of several layers of differing filter media.

The continued efficient performance of filtration units requires the periodic cleaning of the filter media. Thorough cleaning of the filter deck and media requires a very rapid and uniformly distributed passage of fluids, such as water or air, through the bed for several reasons. First, the filter media must be completely fluidized so that the agitation of the particles will effect complete detachment of the dirt particles from the media particles. Second, the fluid flow through the bed must have identical vertical velocities over the entire cross-sectional area of the filter and thus can only be obtained by obtaining a uniform drop in fluid pressure over the filter bed. Different fluid velocities at different points in the filter bed can cause the media particles to rise at those points in the filter bed with greater vertical velocities than at other points and this can (a) result in the undesirable removal of the media particles by entrainment with the wash fluid, and (b) if the particles of the various filter media used do not rise uniformly, upon completion of the backwashing they may not settle in proper sequence and to the proper depth and this will prevent uniform horizontal distribution of the various media over the entire cross-sectional area of the filter when backwashing is resumed. This problem is particularly acute in the case of filters having large cross-sectional areas.

Many attempts have been made to achieve a uniform flow, i.e., equal vertical velocities and fluid distribution, throughout the area of a filter bed but none has been completely successful mainly because of the difficulty of establishing and maintaining a uniform fluid pressure over the entire area of the bed. Initially even a small increase in the vertical fluid flow through a portion of the filter deck at some point will result in imbalanced pressure drops which will result in progressively increased fluid flow through that particular section of the bed. This would tend to leave the other portions of the filter media beds not completely fluidized and consequently unwashed. Porous plates which support the filter media become clogged with fine particles and non-uniform flow and the conditions described above result. Nozzles with various shapes extending into the media and with either gravel or balls surrounding their open discharge ends have not achieved the desired uniform flow as they cause concentrated fluid streams which displace the media unevenly. Hooded nozzles discharging narrow fluid streams through fine slots are not effective when the narrow slots become obstructed with particles and non-uniform flow through the filter deck results, and thus usually leads to a progressive increase in resistance to flow through and a sharp drop in the capability of this filter.

SUMMARY OF THE INVENTION

This invention relates to apparatus, for filtering and backwashing fluids in a system having several layers of differing filtering media contained in a shell, which insures uniform distribution of fluid at equal velocities over the entire cross-sectional area of the filter. The filter media rests on a thin slotted plate, preferably of metal, spaced above the structural deck which provides closely spaced supports for the thin plate. A plurality of nozzles closely spaced in a grid passes vertically through the structural deck to the underside of the then plate. The nozzles have slots at a small distance below the deck and open lower ends. The nozzles have closed upper ends and holes in their vertical walls above the structural deck. Thus, an upper plenum chamber is formed between the thin plate and the structural deck and a lower plenum chamber is formed below the structural deck. For backwashing purposes fluid flow pipes with discharge orifices uniformly spaced under the structural deck introduce fluid into the lower plenum chamber and subsequently through the nozzles into the upper plenum chamber between the structural deck and the thin plate. Fluids, such as water, are passed upwards or downwards through the two plenums. As fluid is introduced into the apparatus through the fluid flow pipes, the lower plenum chamber provides a uniform fluid supply through each nozzle. The upper chamber is supplied with fluid at uniform pressure under the entire filter bed and this uniform pressure is maintained by the resistance to the fluid flow offered by the limited area of the uniformly spaced apertures or slots which cause the vertical velocities upward or downward to be the same over the entire cross-sectional area of the filter unit.

The scope of the invention will be more fully apparent from consideration of the following description of a preferred embodiment of the invention described with reference to the accompanying drawings in which:

DESCRIPTION OF THE PREFERRED EMBODIMENT

The filtering and backwashing apparatus described is suitable for use in a fluid filtration system such as that shown generally in FIG. 1 and to achieve a better understanding of the invention it will be described together with the water filtration system. It is to be understood, however, that the invention may be used with fluid filtration systems other than that illustrated in FIG. 1.

Figure 1:
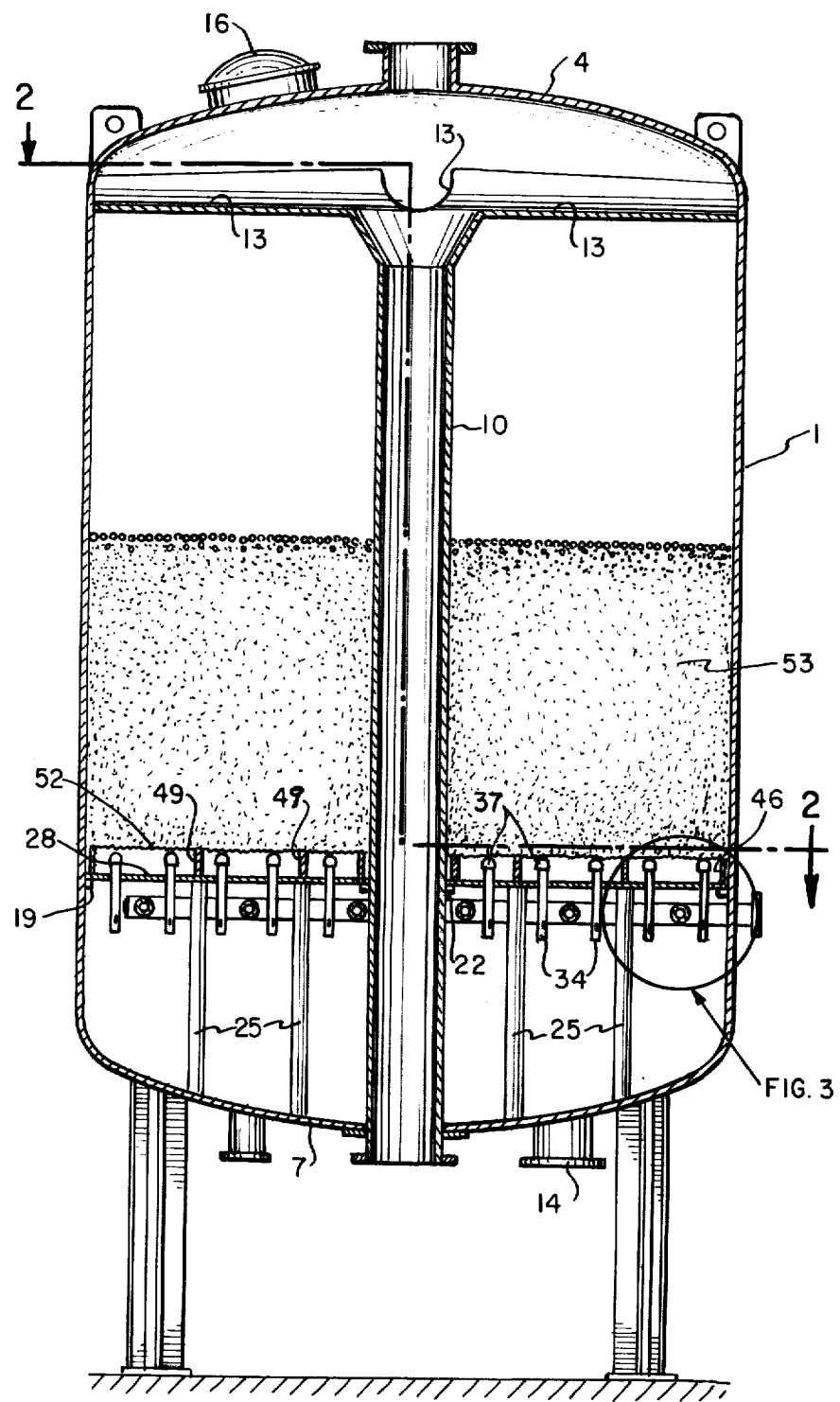
FIG. 1 is a side elevational view of a typical water filtration apparatus suitable for use with the present invention.

Referring to FIG. 1, a water filtration system is contained within a generally cylindrical tank shell 1 having vertical sides and a top 4 and a bottom 7. A shell 1 that is open at the top could also be used with the present invention. A circular pipe 10 coaxial with the vertical axis of shell 1 is positioned from below bottom 7 to within several feet of top 4. At its upper end it is joined by conventional means, permitting fluid flow, to a plurality of distributing troughs 13 extending to the vertical wall of shell 1. The troughs 13 have channels suitable to carry water and open tops. Manhole 16 in top 4 permits access to the interior of shell 1. Bottom 7 also has a duct 14. Valve means (not shown) permit control of the fluid flow through both pipe 10 and duct 14. The valve means permit both to be used to either withdraw or introduce water into the apparatus.

On the inside vertical wall of tank shell 1, bar 19 is welded in a horizontal plane around shell 1. In a preferred embodiment, the dimensions of bar 19 are 1 inch by 1 inch. A similar bar 22 is welded onto the outer surface of pipe 10 at the same vertical position. A plurality of supports 25 extend vertically from shell bottom 7 to the vertical position of bars 19 and 22. In a preferred embodiment, there are 8 supports 25 made of 2½ inch diameter pipe and positioned equally distant from pipe 10. Structural deck 28 rests on bars 19 and 22 and supports 25 which are preferably welded to both deck 28 and shell bottom 7. Deck 28 is spaced from both shell 1 and pipe 10 by a small distance, typically three-sixteenths inches.

Figure 2:
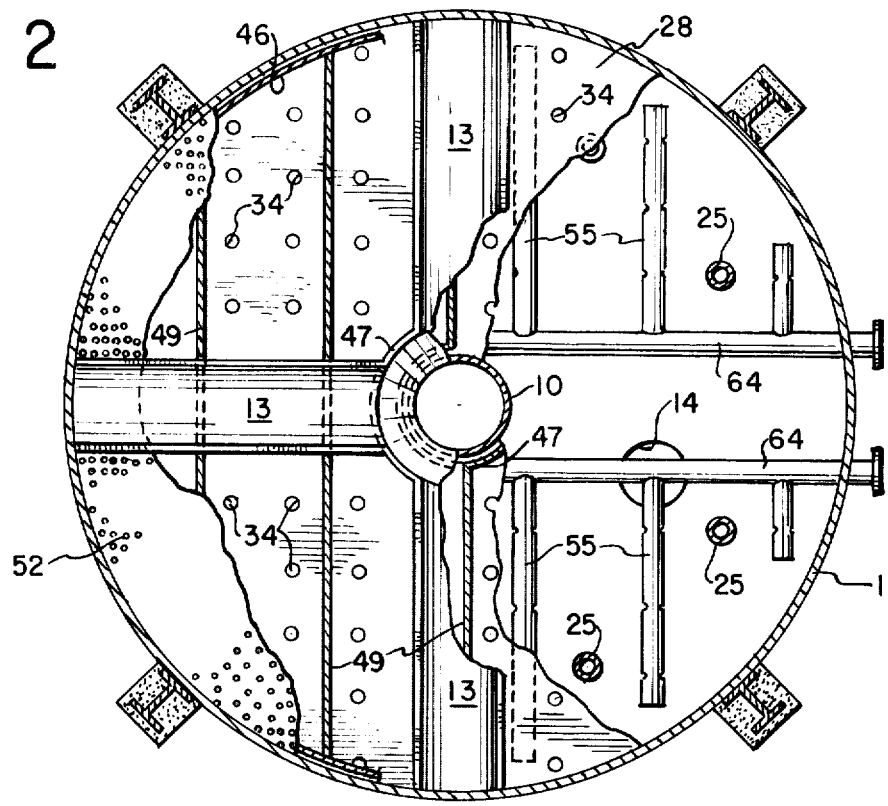
FIG. 2 is a horizontal cross-sectional view of a preferred embodiment of the present invention taken along the line 2—2 of FIG. 1.
Figure 3:
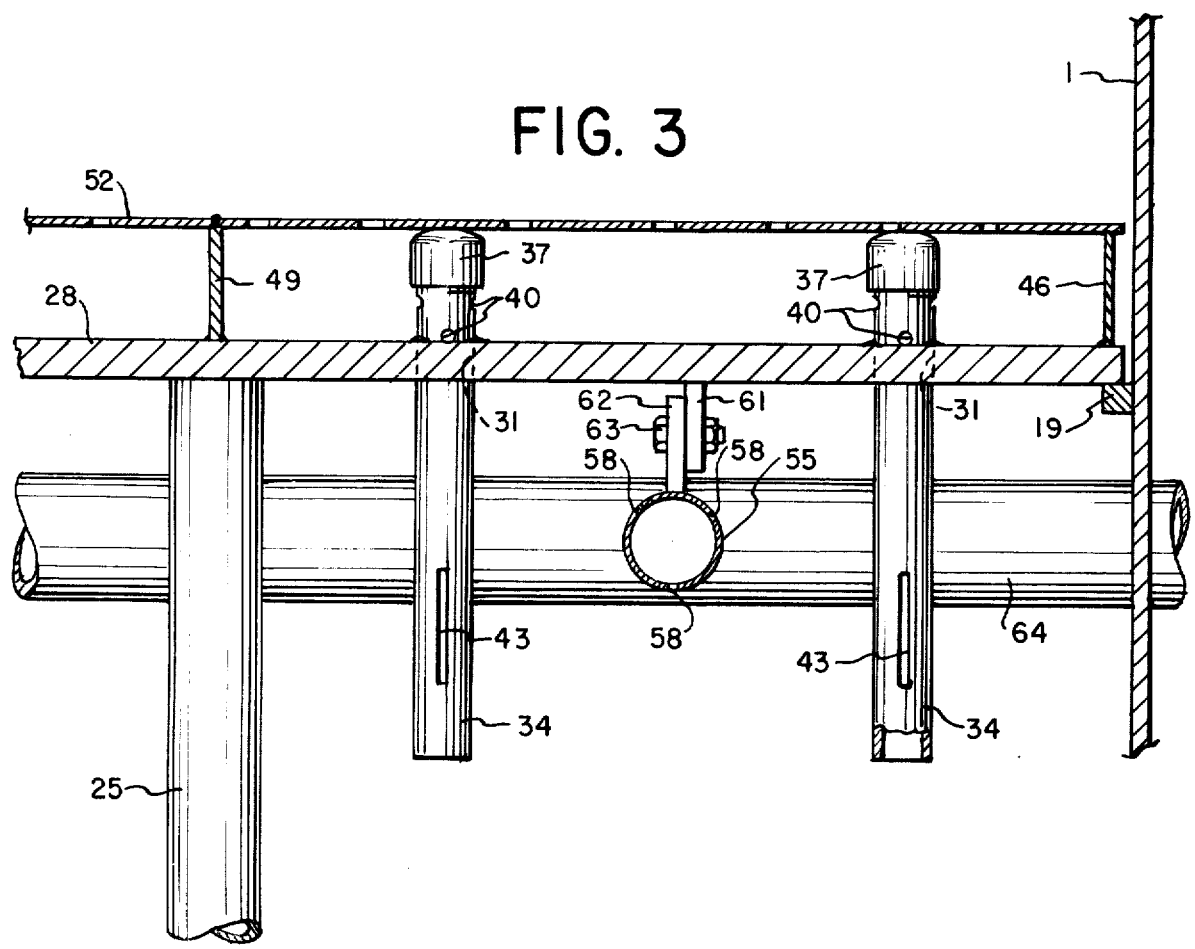
FIG. 3 is a vertical cross-sectional view of area A.

Referring now to FIGS. 1 and 2, deck 28 has a plurality of circular openings 31 spaced apart, in a preferred embodiment, approximately 1 foot in parallel rows spaced apart approximately 1 foot. The openings 31 thus form a grid. Referring to FIG. 3, nozzles 34 extend vertically through openings 31 and are attached to deck 28 by any suitable means such as welding. The nozzles 34 are typically 1½ inch pipes extending 10 inches below deck 28. Each nozzle 34 is closed at its upper end, extending 3 inches above deck 28, by a cap 37 and is open at its lower end. Each nozzle has a plurality of orifices 40 in its vertical wall above deck 28. In a preferred embodiment, there are four orifices 40 per nozzle, each being 9/16 inches in diameter and spaced apart 90°. Each nozzle has a vertical slot 43, about ½ inch wide and approximately 3 inches long beginning about 2 inches from its lower end.

Vertical ribs 46 are welded to deck 28 adjacent both its inner and outer edges, i.e., adjacent both shell 1 and pipe 10. Annular rib 46 extends around the interior of shell 1 and in juxtaposition thereto. Another annular rib 47 extends substantially around pipe 10. Center ribs 49, typically 3 inches high by ¼ inch wide, are welded to deck 28 and spaced apart from each other in parallel rows that are, typically, 2 feet apart. Center ribs 49 are thus parallel to each other and in rows that extend to either shell 1 or pipe 10. Different type supports other than ribs 46 & 49 can be used.

Plate 52 rests on caps 37 of nozzles 34 and is given additional structural support by both ribs 46 and 47, and center ribs 49. Plate 52 is formed from metal sheets, in a preferred embodiment, ⅛ inch thick by 24 inches wide. Adjacent pieces of plate 52 juxtapose and are welded to each other. Plate 52 has slots five-eighths inches long by one-eighth inch wide spaced apart 2 inches in rows that are spaced apart 1½ inches. Filter bed 53 rests on plate 52.

In a preferred embodiment, plate 52 is composed of metal beams which are 2 feet wide and which extend across the diameter of shell 1. However, plate 52 may be made from fiberglass or any other suitable materials which are sufficiently strong to support the filter bed. Furthermore, plate 52 may be composed of one foot by three foot tray-like sections tightly fitted together. In this embodiment, it is desirable to weld the ribs 49 to each of the tray-like plates 52 and to permit the ribs 49 to be supported by deck 28. The tray-like plates are sufficiently heavy to prevent them from moving when the filter bed 53 is backwashed. This configuration permits easy removal of the tray-like plates 52 for cleaning or inspection.

In the preferred embodiment, metal plate 52 is approximately one-eighth of an inch thick. The use of a thin metal plate facilites the manufacture of the numerous small slots in the plate. A thick plate is not needed to support filter media 53 because it is reinforced by the ribs and the closely spaced nozzles.

It is to be understood that the spacing of the ribs and nozzles must be such that they are sufficiently close together to support, with deck 28, the weight of the filter bed. In the embodiment illustrated, both the nozzles and ribs support the filter bed. However, with proper spacing, the filter bed could be supported adequately by only the ribs.

Referring to FIG. 3, a plurality of fluid pipes 55 is placed in a horizontal plane which is parallel to deck 28 and intermediate deck 28 and slots 43. Pipes 55 are typically 2½ inches in diameter. Pipes 55 are arranged parallel to each other and are spaced from the adjacent pipe or pipes by approximately 2 feet. The ends of each pipe 55 extend approximately to shell 1 and are closed. Each pipe 55 has a plurality of holes 58 that permits air to exit from pipe 55. In a preferred embodiment, each pipe 55 has a first series of holes formed by pairs of holes 58 on its top surface and each pair is spaced 12 inches from the adjacent pair. Each hole 58 is 30° above a horizontal plane passing through the center of pipe 55. Holes 58 of each pair are on opposite sides of a vertical plane through the center of pipe 55. Each pipe 55 also has a second series of holes 58, each hole 58 being spaced 2 feet from the adjacent hole 58 and positioned on the bottom of pipe 55. The two series of holes are positioned with respect to each other so that alternate pairs of the first series are in the same vertical plane as the holes of the second series.

Pipes 55 may be maintained in position by any conventional means such as support hanger plates 61 and 62 which are welded to the bottom of deck 28, and to fluid pipes 55, respectively. The two hanger plates 61 and 62 are secured together by a bolt 63. Two parallel fluid inlet pipes 64, in the same horizontal plane and perpendicular to fluid pipes 55, connect to fluid pipes 55 by any conventional means permitting fluid flow between the pipes. Valve means (not shown) permit control of the fluid flow through fluid inlet pipes 64.

The apparatus described above thus forms two plenum chambers. The upper chamber is between deck 28 and plates 52 while the lower chamber is directly underneath deck 28. The two plenum chambers insure that the drop in fluid pressure in moving vertically through the two plenum chambers and the filter bed is equal across the entire horizontal cross-sectional area of the plenum chambers and filter bed. The horizontal openings in nozzles 34 insure a uniform fluid distribution in the upper plenum chamber and thus help maintain uniform fluid pressure across the horizontal cross-sectional area of the filter bed.

When it is desired to backwash the system, valves (not shown) are closed to stop the flow of water into the apparatus through pipe 10 and the flow out of the apparatus through duct 14. Fluid inlet pipes 64 are opened by valve means (not shown) to begin the backwashing by introducing air.

As the air supply through fluid pipes 55 increases, air starts escaping from the lower chamber to the upper chamber through slots 43. The flow increases still more when the air-water interface reaches the level of the open bottoms of the nozzles 34. The arrangement described insures a uniform air supply through each nozzle 34. The space between plate 52 and deck 28 is uniformly filled with air. The slight pressure resistance caused by the restricted area of the open holes in plate 52 maintains the air pressure under the plate uniform over the entire deck area. A second plenum chamber is thus formed from which air flows uniformly upward through both the slots in plates 52 and filter bed 53.

The upflowing air agitates the filter media and loosens the dirt particles. After the initial agitation by air, duct 14 or fluid inlet pipes 64 and fluid pipes 55 may be used to introduce backwash water into the system. The valves may be adjusted so that either an air-water mixture or only water is flowing into the apparatus. The backwash water or air-water mixture flows upward through the filter bed 53 until it reaches distributing troughs 13 which carry the water to pipe 10 and thence out of the apparatus. The two plenum chamber arrangement discussed above insures a uniform upward flow of either an air-water mixture or water through filter bed 53 in the same manner as it did for air alone.

With the arrangement described, a uniform upward fluid flow is obtained and a thick gravel bed or system of coarse material for distributing the fluid flow uniformly over the filter deck is not needed and the filter media immediately over plates 52 need not consist of gravel or other coarse material.

The apparatus described also provides for improved filtration of fluids flowing through the filtration system. The two plenum chambers and nozzles also insure uniform fluid flow downward through the filter bed during filtration. The fluid flows uniformly through the filter bed without flowing more rapidly in some areas of the filter bed and the entire cross-sectional area of the filter deck is thus utilized.

Although a preferred embodiment of the invention has been described, it is to be understood that this disclosure is for the purposes of illustration only and certain modifications may be obvious to those skilled in the art, and as a result, the scope of the invention is to be determined by reference to the following claims.

What is claimed is:

1. Improved filtering and backwashing apparatus for a filter bed used in a fluid filtration system having support means for said filter bed, the improvement comprising:

a first plenum area positioned below and common to said entire filter bed;

a plurality of second plenum chambers, each of said second chambers being positioned above said first plenum area and below said filter bed;

a structural deck, said deck positioned intermediate said first plenum area and said second plenum chambers;

a plate positioned intermediate said filter bed and said second plenum chambers, said plate having openings providing fluid communication between said filter bed and said second chambers;

a plurality of nozzles being positioned within said structural deck, each of said nozzles having an outer circumferential wall, a top end, a bottom end, a first portion extending above said structural deck into one of said plurality of second plenum chambers and a second portion extending below said structural deck into said first common plenum area, said nozzle first portion being an outer circumferential wall having openings formed therein, and said nozzle top end being closed and supporting said plate, said nozzle second portion being an outer circumferential wall having a slot formed therein, said nozzle bottom end being closed;

a plurality of ribs extending transversely of said filter bed and being positioned between said structural deck and said plate, said ribs supporting said plate.

* * * * *